Jan. 30, 1968    M. E. CLARK    3,366,966
ACCELERATION-TIME RECORDER FOR ORDNANCE
Filed March 7, 1966    2 Sheets-Sheet 1
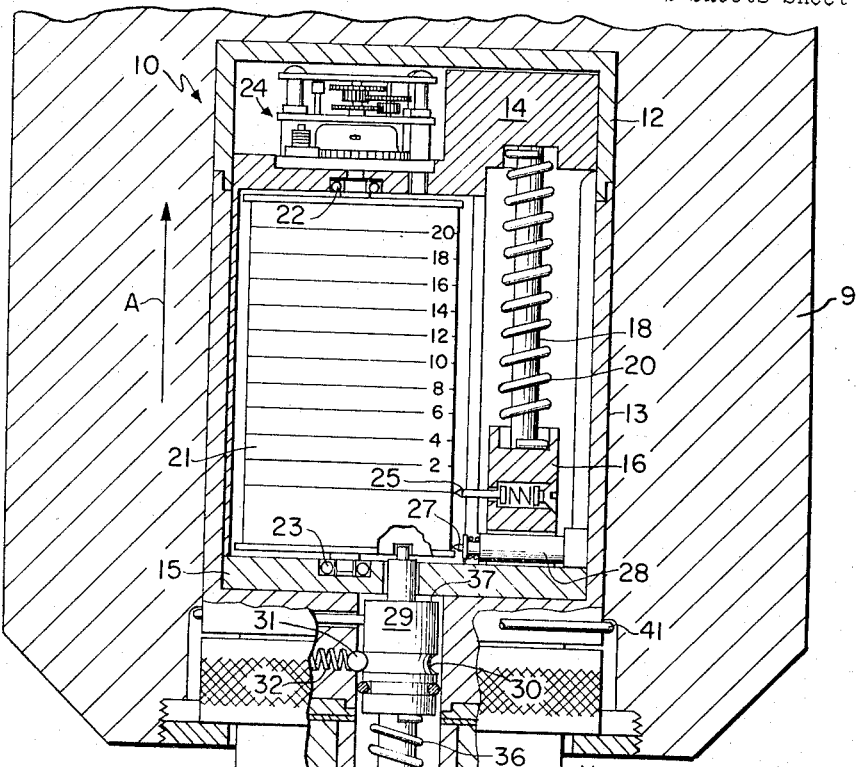
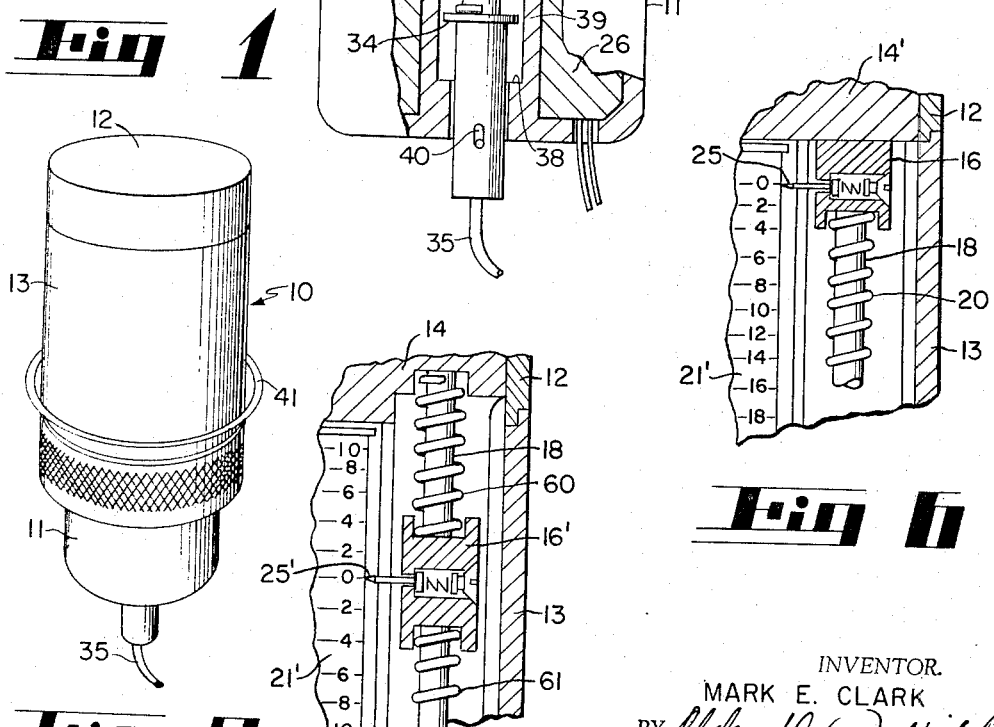
INVENTOR.
MARK E. CLARK
BY Alden W. Redfield
Charles M. Hogan
ATTORNEYS.

Jan. 30, 1968    M. E. CLARK    3,366,966
ACCELERATION-TIME RECORDER FOR ORDNANCE
Filed March 7, 1966    2 Sheets-Sheet 2

INVENTOR.
MARK E. CLARK
BY
ATTORNEYS.

United States Patent Office 3,366,966
Patented Jan. 30, 1968

3,366,966
ACCELERATION-TIME RECORDER
FOR ORDNANCE
Mark E. Clark, Richmond, Ind., assignor to Avco Corporation, Richmond, Ind., a corporation of Delaware
Filed Mar. 7, 1966, Ser. No. 532,364
6 Claims. (Cl. 346—7)

ABSTRACT OF THE DISCLOSURE

The disclosure illustrates an essentially self-contained decelerometer which is mounted in a bomb to provide a recording of the deceleration to which the bomb is subjected during its flight. An element is urged into a stable position and is linearly displaced as a function of acceleration. That element carries a stylus which records ordinates on a time-base drum. The recording device includes mechanism for positively locking the decelerometer from operation until the bomb is dropped, at which time the locking device is kept out of engagement. The decelerometer also includes means to record selected events which occur during the course of the bomb's trajectory.

The present invention relates to instruments for testing the performance of accelerating or decelerating mechanical configurations, with specific reference to retarded bomb fuzes.

In prior art practice, test fuzes are equipped with switching circuits which are employed to furnish intelligence concerning specific events in the operation of the fuze, such as lanyard pull, deployment of the retarder, time of arming, and so forth. This intelligence is telemetered to ground stations in order to permit evaluation of the performance of the fuze in terms of specific discrete events.

The present invention involves an appreciation of the need for a device which not only performs the function mentioned above, but which furnishes a continuous measurement and record of the forces, including gravitational forces, experienced during bomb drop, as a continuous function of time, and the principal object of the invention is to provide a device which performs the latter function.

A subordinate feature is to provide a device which performs both of the functions here considered.

Further objects of the invention are to provide a G-time recorder which possesses the following attributes:

(1) Sufficient ruggedness to withstand destructive forces experienced during a bomb drop and impact or the like, and to preserve the recorded data;

(2) Positive safety features which safeguard the recording instruments against unintentional or premature operation;

(3) A locking feature which assures continuous operation of the timing devices, once started.

The symbol "G" is an abbreviation for acceleration forces in a general sense, as including either positive acceleration or deceleration. In the preferred embodiment herein shown, deceleration is measured.

In general, the over-all object of the invention is to provide a recording device of utility in measuring and/or recording retardation, deceleration, set-back force, event data, impact force levels, and positive acceleration.

For a better understanding of the invention, together with other and further objects, advantages, and capabilities thereof, reference is made to the following description of the appended drawings, in which:

FIG. 1 is an axial sectional view through a preferred embodiment of G-time recorder in accordance with the invention, showing it in the safe condition as installed in the aft portion of a bomb;

FIG. 2 is a perspective view of the exterior of the device;

FIGS. 6 and 7 are fragmentary views of alternative arrangements of the recording device which enable the device of FIG. 1 to function respectively as an accelerometer and as a combination decelerometer-accelerometer.

Figure 3:
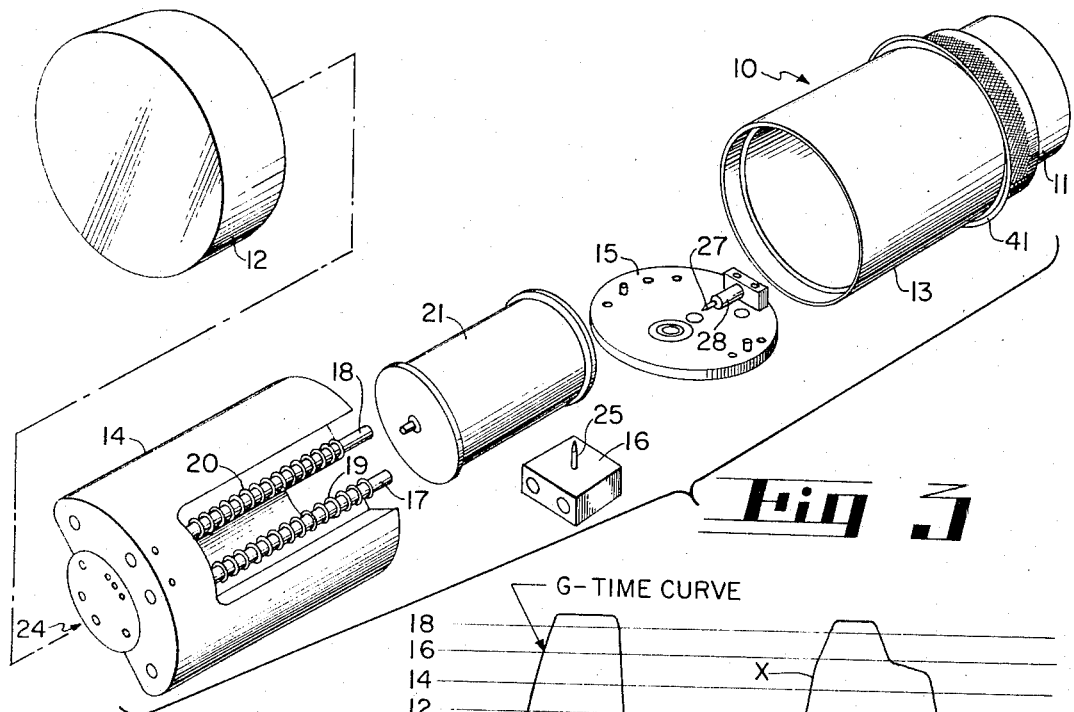
FIG. 3 is an exploded view showing in perspective the principal mechanical components of the device.

Referring now specifically to FIGS. 1 and 3, there is shown a generally cylindrical housing 10, which has a substantially closed extension 11, together with a removable housing cover or cap 12. These parts are of metal, and they contain the working components of the G-time recorder in accordance with the invention. This recording device, by way of example, is installed in the aft portion of a bomb 9 whose characteristics are to be tested.

The body 10 is formed with a bottom portion 13. Disposed within the body are a suitably shaped frame member 14 and a removable partition 15 which provide for mounting the parts now described. In practice the displacement of the entire G-time recorder is inverted from the FIG. 1 position and falls with the bomb in the direction of the arrow A (FIG. 1) as the bomb drops.

Mounted for translatory movement within the housing 10 is a displaceable mass or sensing element 16, which is so operated on by gravitational forces that if for any reason the vertical movement of the bomb 9 is decelerated during its drop, the mass or sensing element 16 moves away from the frame member 15. The mass is therefore suitably formed for linear sliding movement on rods 17 and 18, fixed to frame 14. Such displacement of the mass is resisted by compression springs 19 and 20, respectively mounted on the rods 17 and 18 and secured to the mass 16. It will be understood from the foregoing that the displacement of the mass 16 at any given instant is a function of the component of deceleration in the axial direction of the two rods.

In the specific embodiment herein shown in FIGS. 1 and 3, the mass 16 is so mounted as to sense deceleration, and the recorder is therefore a decelerometer. Location of the springs 19 and 20 between the mass 16 and the partition 15 would convert the device into an accelerometer as shown in FIGURE 6. Additionally, the provision of two pairs of springs 60, 61, one pair on each side of the mass 16', would enable the principal G-time recorder 21', 25' to function both as an accelerometer and as a decelerometer as shown in FIG. 7.

The displacements of the mass 16 are recorded on a conventional drum 21 mounted, in parallelism to the rods, between elements 14 and 15 and suitably journaled in bearings 22 and 23. The drum is rotated at constant speed by a conventional timing and driving device 24. Such timing and driving devices are well known to those skilled in the art, and optionally employ any one of various types of escapements, such as the verge type escapement or the Junghans type. It is within the ordinary skill of the art to provide such escapements and gearing as to achieve any practical accuracy or time scale.

The drum 21 carries a roll of commercially available wax-coated pressure-sensitive paper on which the G-time curves and event timing data are recorded. Mounted to project laterally from the mass 16 is a spring-biased recording stylus 25 adapted to press lightly against the coated surface of the paper on drum 21 as the drum rotates and as the stylus is linearly displaced, axially of the housing, by forces of decelration which move the mass 16. The deceleration and/or acceleration parameter is graphed as a continuous ordinate on a framework of Cartesian coordinates in which the displacement of the drum furnishes the time base or abscissa parameter, the operation of recording drums and styli being per se well known.

Now, the stylus 25 causes to be recorded continuous deceleration and/or acceleration data. In some tests it may be desired to coordinate the display of these data with timed intervals defining certain special events, such as lanyard pull, etc. The time period of any such event is caused to be indicated by an additional spring-biased stylus 27, secured to partition member 15 of the housing and adapted to be advanced to touch drum 21 or retracted into inoperative position by reason of the operation of a solenoid 28, controlled by the switching circuitry illustratively shown in FIG. 4. The solenoid 28 is powered by a battery 26, located in extension 11.

Referring now to certain safety and locking features of the invention herein disclosed, a pin or plunger 29 is normally held in a "safe" position of engagement with drum 21, preventing rotation of the drum, by reason of pressure exerted against the lower curved annular shoulder or groove 30 by a plurality of detent balls 31 (only one of which is shown in FIG. 1), each urged inwardly by a spring such as 32. The pin 29 is formed with an enlarged head, an intermediate narrow section, and then an enlarged trailing section having an aperture 40 through which a lanyard 35 projects. The other end of the lanyard is secured at the aircraft which drops the bomb. A sleeve 34 embraces the narrow portion of the pin, and between the sleeve 34 and the head of the pin is a spring 36. When the lanyard 35 is pulled, the cycle of operation is as follows: pin 29 is retracted away from drum 21, releasing the drum so that the drum starts its rotation. When the pin 29 retracts sufficiently, the detent balls 32 slide over the flange surface 37 of the pin, to assure that the pin cannot again engage the drum 21. When sleeve 34 abuts against a complementary annular shoulder 38 formed in an integral well portion 39 of the extension 11, then the sleeve 34 is arrested and spring 36 is compressed as the lanyard 35 is released. Additionally, the lanyard pull-pin 29 is formed with a through aperture into which a safety wire 41 projects.

The lanyard 35 is connected to the aircraft which carries the bomb, so that the lanyard is pulled when the bomb is released. The three ball detents such as 31 insure that a reasonably strong pull will be required to move the lanyard pull-pin 29 back, and the detents thereby safeguard against an unintentional start of the recorder. The ball detents also lock the lanyard pull-pin in pulled back position and thereby provide continuous operation of the timer once it is started.

Until the G-time recorder is installed in the device whose performance is to be checked, such as in the rear well of the bomb (or nose well, as the case may be), the safety wire 41 will prevent any motion of the pull-pin 29. The design is preferably arranged in such a manner that the G-time recorder cannot be installed in the bomb without first removing the safety wire.

In order to prevent oscillation and vibration, the springs 19 and 20 and mass 16 are suitably damped, using viscous friction and/or air damping means (not shown).

Variations in mass of element 16, G-weight springs, and viscous damping or the like can be used to effect wide variations in the scale factor, the natural frequency, and the damping of the system.

The stylus may be operated with a rapid response from a 28-volt battery, say, which may be of the commercial dry-cell type. However, other batteries such as thermal or ammonia-type may be used if warranted by the environmental as well as shelf-life requirements.

Figure 4:
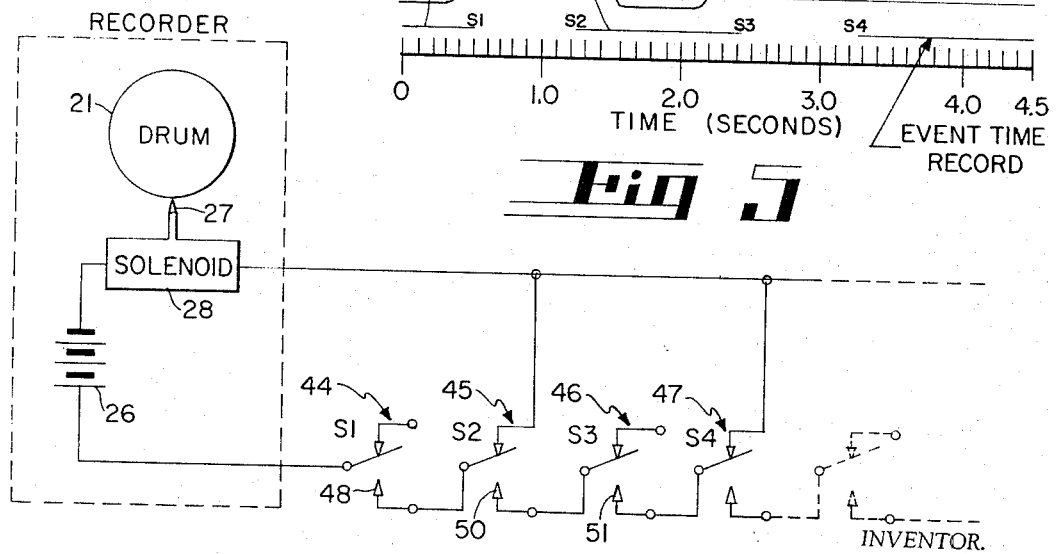
FIG. 4 is a circuit schematic of the electrical switching circuitry incorporated in the device.

Referring now to FIG. 4, each of the switches there shown and numbered 44, 45, 46, 47 is of the single-pole, double-throw type. As shown, switch 44, when closed on contact 48, enables switch 45, which when closed on contact 49 completes an energizing circuit from the battery 26 to the solenoid 28, withdrawing stylus 27 from drum 21, thereby interrupting the event-time recording. Similarly, switches 45 and 46 when closed on contacts 50 and 51, respectively, enable switch 47 to complete a circuit to solenoid 28 and to energize the solenoid. That is to say, if switch 44 is closed on contact 48 and switch 45 is in the position shown in FIG. 4, then the stylus causes a recording line to be made on the drum until switch 45 is de-activated by closing on contact 50. None of the other switches can close an energizing circuit for the solenoid unless switch 44 is activated contact 48. Similarly, none of the switches to the right of switch 45 can complete such an energizing circuit unless switch 45 is closed on contact 50. Likewise, the energizing circuit through switch 47 is not completed unless switch 46 is closed. The switches are caused to be closed by event-monitoring means (not shown) which sense the fact that an event (such as lanyard pull) is occurring, and cause the appropriate switches accordingly to be operated.

Figure 5:
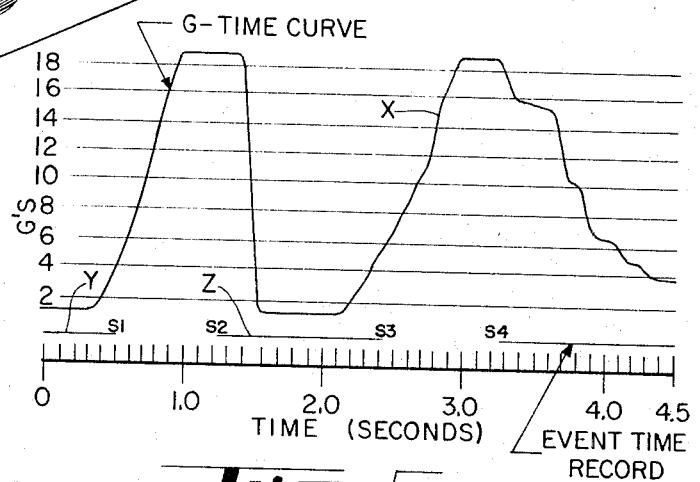
FIG. 5 is an illustrative G-time graph as produced by the device during a typical test.

Referring now to FIG. 5, there is shown at X a typical G-time curve produced by the stylus 25. At Y and Z are shown line records of event times as produced by stylus 27.

While there has been shown and described what is at present considered to be the preferred embodiment of the invention, it will be understood by those skilled in the art that various modifications and changes may be made therein without departing from the scope of the invention as defined by the appended claims.

I claim:

1. A recording instrument adapted to be installed in a bomb for the purpose of establishing and maintaining a continuous record of the rate of change in the velocity of said bomb during its fall, comprising:

a generally cylindrical multi-piece housing formed for insertion in the bomb,
   an element displaceable in said housing, said element having sufficient mass to be displaced in response to the rate of change of velocity of said bomb,
   means for mounting said element in said housing to guide the displacement thereof in a direction generally parallel ot the line of motion of said bomb,
   means for yieldably urging said element in a given direction so that displacement of said element against the action of the yieldable urging means is proportional to the rate of change of velocity of said bomb,
   a drum-type recording device including a rotatably mounted drum positioned within the housing and a first stylus carried by said element, said mounting means and urging means being positioned alongside said recording device,
   means within the housing for driving said drum at constant speed,
   a second stylus displaceable within the housing towards said drum,
   and means for selectively urging the second stylus into the drum for recording the duration of specific events.

2. A recording instrument per claim 1 in which the selective urging means comprises:

a solenoid,
   a source of energy,
   and switching means for encircuiting the source with the solenoid in accordance with the event to be recorded.

3. A recording instrument adapted to be installed in a mechanical device for the purpose of establishing and maintaining a continuous record of the rate of change in velocity of said device during its travel, comprising:

a housing adapted for insertion in the device,
   an inertia element displaceable in said housing solely as a function of acceleration, said element having sufficient mass to be displaced in response to the rate of change of velocity of said device,
   means for mounting said element in said housing to guide the displacement of said element in a direction generally parallel to the line of motion of said mechanical device, means for yieldably urging said element into a stable position so that displacement of said element against the yieldable urging means is proportional to the rate of change of velocity of said device, a drum-type recording device including a rotatably mounted drum positioned within the housing and a stylus carried by said element, said mounting means and urging means being positioned alongside said recording device, and means within the housing for driving said drum at constant speed so that the recording device measures instantaneous acceleration values on a time base.

4. A recording instrument as in claim 3, wherein said yieldable urging means comprises:

a coil spring positioned to urge said element in a direction opposite the direction of travel of said device.

5. A recording instrument as in claim 4 wherein said yieldable urging means comprises:

a coil spring positioned to urge said element in the direction of travel of said device.

6. A recording instrument as in claim 5 wherein said yieldable urging means comprises:

first and second coil springs acting respectively on opposite sides of said element.

References Cited
UNITED STATES PATENTS

| | | | |
|---|---|---|---|
| 2,317,028 | 3/1943 | Chappell | 346—7 |
| 2,679,756 | 6/1954 | Peck et al. | 73—167 |
| 2,698,215 | 12/1954 | Peck | 346—7 |
| 2,959,459 | 11/1960 | Ryan | 346—7 |

RICHARD B. WILKINSON, *Primary Examiner.*

E. C. SIMMONS, *Assistant Examiner.*